MILLER & ELLIS.
Velocipede.

No. 86,682. Patented Feb. 9, 1869.

Witnesses.
William Bauer
Thomas Johnson

Inventors.
C. H. Miller
G. Ellis
by Knight Bros
Attys

CHARLES H. MILLER AND GEORGE ELLIS, OF CINCINNATI, OHIO.

Letters Patent No. 86,682, dated February 9, 1869.

IMPROVEMENT IN VELOCIPEDES.

The Schedule referred to in these Letters Patent and making part of the same.

*To whom it may concern:*

Be it known that we, CHARLES H. MILLER and GEORGE ELLIS, both of Cincinnati, Hamilton county, Ohio, have invented a new and useful Improvement in Velocipedes; and we hereby declare the following to be a full, clear, and exact description thereof, reference being had to the accompanying drawings, making part of this specification.

Our invention relates to the provision of a guard, or fender, for protecting the person of the rider from mud or dirt projected from the wheels.

Figure 1:
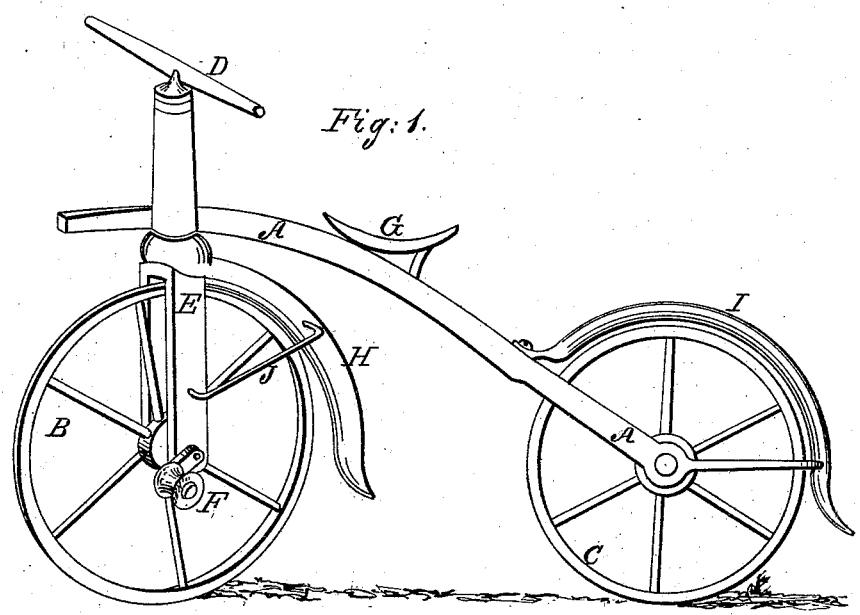
Figure 1 is a side elevation of a velocipede embodying our invention.
Figure 2:
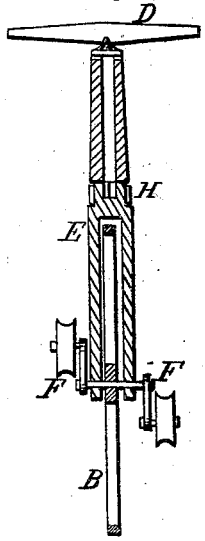
Figures 2 and 3 are sections in the lines $x$-$x$ and $y$-$y$, respectively.
Figure 3:

The following parts may be of customary construction, namely, the perch A, front or pilot-wheel B, rear wheel C, tiller D, king-bolt E, driving-cranks F, and seat G.

Our improvement consists in the provision of the semi-tubular guards, sheaths, or fenders H and I, preferably of metal, attached to the king-bolt E and the perch A respectively, or in any other manner preferred, and covering the upper and rear portions of the peripheries of the wheels, so as to catch all particles of mud or dirt which may be projected by their centrifugal action.

One or more braces, J, may be employed to hold the fenders securely in position.

The attachment of the fenders may be by bolting, welding, or otherwise.

While preferring the represented semi-tubular form of fender, we reserve the right to make it of flat or of any other form, and of metal or wood, and applied to one or more wheels, whether of a two, or three, or more-wheel velocipede.

We do not claim wheel-fenders broadly; but

What we do claim, and desire to secure by Letters Patent, is—

The fenders H and I, the former braced to the standard, and the latter to the perch and axle, substantially as and for the purpose set forth.

In testimony of which invention, we have hereunto set our hands.

CHARLES H. MILLER.
GEORGE ELLIS.

Witnesses:
GEO. H. KNIGHT,
JAMES H. LAYMAN.